US009050940B2

(12) United States Patent
Geiss

(10) Patent No.: US 9,050,940 B2
(45) Date of Patent: Jun. 9, 2015

(54) MOTOR VEHICLE HAVING A CAPACITIVE DEFORMATION SENSOR FOR COLLISION DETECTION

(75) Inventor: Markus Geiss, Möttingen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/118,142

(22) PCT Filed: May 8, 2012

(86) PCT No.: PCT/EP2012/001968
§ 371 (c)(1),
(2), (4) Date: Nov. 15, 2013

(87) PCT Pub. No.: WO2012/156042
PCT Pub. Date: Nov. 22, 2012

(65) Prior Publication Data
US 2014/0084607 A1    Mar. 27, 2014

(30) Foreign Application Priority Data
May 18, 2011    (DE) .......................... 10 2011 101 863

(51) Int. Cl.
*B60R 19/48*    (2006.01)
*B60R 21/0136*    (2006.01)

(52) U.S. Cl.
CPC .................................. *B60R 21/0136* (2013.01)

(58) Field of Classification Search
CPC ............ B23D 33/04; B23K 9/30; B62D 1/06;
C07C 51/412; C10M 141/10; B60R 21/017;
F28F 2275/143; F28D 1/0435; F28D 1/05375;
F28D 2021/0084
USPC ......... 293/117; 296/193.09, 203.02; 280/735;
340/436
See application file for complete search history.

(56) References Cited

U.S. PATENT DOCUMENTS

| 3,703,300 | A | 11/1972 | Gillund et al. |
| 7,137,472 | B2 * | 11/2006 | Aoki .............................. 180/274 |
| 7,164,349 | B2 | 1/2007 | Kawaura et al. |
| 7,364,222 | B2 * | 4/2008 | Tanabe ..................... 296/187.03 |
| 7,631,565 | B2 * | 12/2009 | Tanabe ....................... 73/862.474 |
| 7,733,219 | B2 * | 6/2010 | Kamei et al. .................. 340/436 |
| 8,491,039 | B2 * | 7/2013 | Mikutsu ................... 296/187.11 |
| 8,773,150 | B2 * | 7/2014 | Hironaka ....................... 324/705 |
| 8,935,087 | B2 * | 1/2015 | Suzuki et al. ................. 701/301 |
| 2007/0102220 | A1 * | 5/2007 | Kiribayashi ................. 180/274 |
| 2007/0164574 | A1 * | 7/2007 | Tanabe ........................... 293/102 |
| 2007/0246333 | A1 * | 10/2007 | Kawaura et al. ...... 200/61.45 M |

FOREIGN PATENT DOCUMENTS

| DE | 42 42 230 | 6/1994 |
| DE | 43 08 353 | 8/1994 |
| DE | 197 18 803 | 10/1998 |
| DE | 102004052880 | 6/2005 |
| DE | 102007001387 | 7/2007 |
| DE | 102008044211 | 6/2010 |
| DE | 102009000158 | 7/2010 |
| JP | 2000-177514 | 6/2000 |
| JP | 2000-326808 | 11/2000 |

* cited by examiner

*Primary Examiner* — Kiran B Patel
(74) *Attorney, Agent, or Firm* — Henry M. Feiereisen LLC

(57) ABSTRACT

A motor vehicle includes a fender provided at the front and the rear and at least one sensor device including a capacitively operating sensor and an associated control device for collision detection, wherein the sensor is arranged on a fender and is formed as a surface sensor which extends over at least half the width of the fender, wherein the control device is able to determine information resulting from a collision with an object by using the capacitance of the sensor, which changes as a result of collision-induced deformation of the sensor.

23 Claims, 4 Drawing Sheets

MOTOR VEHICLE HAVING A CAPACITIVE DEFORMATION SENSOR FOR COLLISION DETECTION

CROSS REFERENCE TO RELATED APPLICATIONS

This application is a U.S. National Stage of International Application No. PCT/EP2012/001968, filed May 8, 2012, which designated the United States and has been published as International Publication No. WO 2012/156042 and which claims the priority of German Patent Application, Serial No. 10 2011 101 863.1, filed May 18, 2011, pursuant to 35 U.S.C. 119(a)-(d).

BACKGROUND OF THE INVENTION

The invention relates to a motor vehicle including a metal component provided on a front side, a rear side and/or a lateral side, in particular a bumper and at least one sensor unit including a capacitively operating sensor and an associated control device for collision detection.

Modern motor vehicles include different restraint means such as an airbag or seat belt tensioner which serve the safety of occupants. In case of a crash these restraint means are controlled via corresponding control devices, wherein the control is not carried out in a static manner but as the case may be, also in dependence on the collision or respectively the severity of the collision. As a consequence, a collision detection device is provided in modern vehicles which allows detecting data which can serve as basis for calculating the severity of a collision. Usually acceleration sensors situated in the front of the vehicle are used for this purpose, however a capacitively operating collision sensor which changes its capacitances in dependence on the actually occurring collision can also be used for data acquisition, see JP 20000326808. The data acquisition has to occur very rapidly, for which usually a time period of 20-50 ms is available. The control device which is assigned to the collision detection unit determines from the recorded measuring values items of collision information such as the relative collision speed or the overlap with the collision partner. For this purpose multiple sensors with narrow perimeters of operation are distributed over the vehicle front are provided.

Because the installed sensors have only narrow perimeters of operation, i.e., due to their small size operate within only a relatively small area relative to the entire possible collision surface, the relative collision speed can only be determined roughly which is due to the fact that the own vehicle often only interacts locally, be it on the front side or on the rear side, with different collision partners who in addition may also have different stiffness characteristics (for example a wall into which the own vehicle drives is significantly stiffer than a vehicle which has a crumple zone). In addition, due to the functioning of the sensors within narrow perimeters of operation an estimation of the overlap with the collision partner is hardly possible. Due to the very short decision time until actuation or triggering of the restraint means a recognition of the impacted side is problematic in case of a collision.

SUMMARY OF THE INVENTION

The invention is thus based on the object to set forth a motor vehicle which has improved collision detection and as a result therefrom enable an improved detection of items of collision information, which serve as basis for the actuation of restraint means.

For solving the problem in a motor vehicle of the type mentioned above it is provided that the sensor is arranged on a metal component, in particular a bumper and is configured as area-sensor which extends over at least half of the width of the metal component in particular the bumper, wherein the control device is capable of determining information resulting from a collision with an object by way of the capacitance of the sensor that changes as a result of a collision-related deformation of the sensor.

Particularly advantageously, the motor vehicle according to the invention has an area-sensor, i.e., a sensor which extends over a large surface, at least over half the width of the metal component on which the sensor is arranged. Such a metal component can for example be a bumper but also another metallic component of the vehicle structure, for example a door impact member mounted on a side or a sill or another transverse or longitudinal member of the vehicle structure or the vehicle body. Each motor vehicle has for example a bumper, usually made of steel or aluminum which is usually arranged behind a front and rear panel. The area-sensor is located on this bumper i.e., also behind the rear panel, which sensor in this case extends over at least half the width of the bumper, preferably over at least 80% of the width of the bumper and preferably over the entire length of the bumper. Due to the large area of the sensor it is possible to define a large detection surface with the sensor or a large detection area within which a possible collision quasi directly reaches through to the sensor, i.e., the sensor is directly influenced so that the data acquired by the sensor more or less are a direct measure for the collision. As a result, items of collision information such as the relative speed and in particular also the overlap can be detected very accurately. Because in contrast to the state of the art, where in a manner of speaking a punctiform measurement occurs, because the sensors are only small-dimensioned local sensors, the area-sensor offers a large-area data acquisition plane.

The area-sensor operates based on capacitance, wherein its capacitance changes in case of a collision-related deformation. This capacitance change is detected by the control device and analyzed based on which the corresponding data on which the subsequent control of the restraint means is based are determined.

As described before, the sensor extends preferably over at least 80% of the component width, i.e., for example the width of the bumper preferably over the entire width. The sensor also preferably extends at least over half the height of the metal component, i.e., for example the bumper, preferably over the entire height of the metal component. The larger the area-sensor, the greater the data acquisition surface and the more accurate the data acquisition.

According to a refinement of the invention, the sensor itself is constructed as plate condenser, wherein the metallic bumper as described made of aluminum or steel, forms one of the condenser electrodes. This means that a component that is already included is used in an additional function, here as condenser electrode. According to a refinement of the invention, for the configuration of the sensor a layer of a dielectric is disposed on the metal component, for example the bumper, on which layer a second condenser electrode is disposed by means of which second layer the capacitively operating sensor is thus completed. The construction of the sensor is thus very simple and can be configured to a corresponding size.

The dielectric is preferably a plastic, in particular a foamed plastic. A foamed thermoplastic or a foamed elastomer can for example be used. In a concrete embodiment, an expanded polypropylene can be used as foamed plastic. The important aspect is that the dielectric on one hand has sufficient dielectric properties and on the other hand also a corresponding deformability so that it is deformed in the case of a crash. This deformation results in a variation of the distance of the two condenser electrodes relative to each other in the region in which the collision occurs. In turn, the change of the distance results in a change of the capacitance of the plate condenser. The capacitance in turn can be measured and also the temporal course of the change in capacitance based on which the corresponding collision parameters can be determined. As dielectric a commonly used pedestrian protective foam can for example be used.

The dielectric itself has a thickness in the range from 1-10 cm in particular of 3-7 cm, preferably of about 5 cm. This offers a sufficient deformation path and with this a sufficient path over which the electrode distance can vary.

In an advantageous refinement, the second condenser electrode is formed by means of a metal foil a optionally fiber-reinforced metal fabric or a precipitated metal layer. Each of these embodiments offer the possibility to form a large-area condenser electrode. Preferably aluminum is used or the metal foil, the metal fabric or the metal layer contains aluminum. The thickness of the metal foil, the metal fabric or the metal layer is preferably in the range from 10-1000 µm, in particular in the range of 100-500 µm. It is to be selected as thin as possible in order to save material because the condenser electrode merely has to perform the function of an electrode but no other property. The electrode is also sufficiently flexible so that it readily deforms in case of a collision and the electrode distance and with this the capacitance changes. Locally small deformations and/or very small deformations also lead to a change in distance and with this a change in capacitance and can thus be detected and taken into account. Due to the planarity a deformation is also possible at any location over the sensor surface, i.e., the deformation and with this the signal generation occurs consequently immediately at a location where the collision-related force introduction occurs which can basically be of any type i.e, for example punctiform or large-area depending on the collision object and severity of the collision.

For easy processability and also for protection of this condenser electrode it is provided according to a useful refinement of the invention that the metal foil, the metal fabric or the precipitated metal layer is disposed on a carrier, in particular a plastic carrier. The condenser electrode can also be arranged for complete encapsulation between two carriers, in particular plastic carriers. Especially when in the case of the metal foil or the metal fabric the condenser electrode is glued on the carrier, a metal layer can as the case may be, precipitated directly on the carrier. The carrier serves on one hand for stabilization and on the other hand also for protection of the very thin electrode. Such a carrier can for example be a plastic foil, in particular made of polyester. This foil should be as resistant to tearing and impact as possible, i.e., sufficiently stable. It should also be as thin as possible, the thickness should be in the range from 100-1000 µm in order to ensure deformation of the electrode as immediate reaction to a collision related force input.

In a particularly useful refinement of the invention, the second electrode is divided into individual isolated electrode sections, in particular by multiple slots, wherein each electrode section is connected with the control device. As a result the second electrode for example formed by the metal foil or the metal fabric is divided into multiple sectors, wherein each sector is closed on the other side via the one-piece bumper as other condenser electrode. These individual electrode sectors are preferably arranged adjacent one another viewed horizontally, so that in horizontal direction a row of adjacent individual condenser sectors results. Each condenser sector is connected separately with the control device, i.e., separate data can be acquired with regard to the sector. This enables particularly advantageously to detect the overlap more accurately. Because in the case of a collision only one condenser may be affected which is deformed and which as a result produces a different signal than the other sectors so that depending on the size of the individual sectors an even more accurate local collision determination can occur. For example the second condenser electrode is divided into five sectors or segments so that overall five individual condenser segments or sectors result, wherein of course an even finer subdivision is possible.

BRIEF DESCRIPTION OF THE DRAWING

Further advantages, features and details of the invention become apparent form the exemplary embodiment describe in the following and by way of the drawings. It is shown in.

DETAILED DESCRIPTION OF THE PREFERRED EMBODIMENTS

Figure 1:
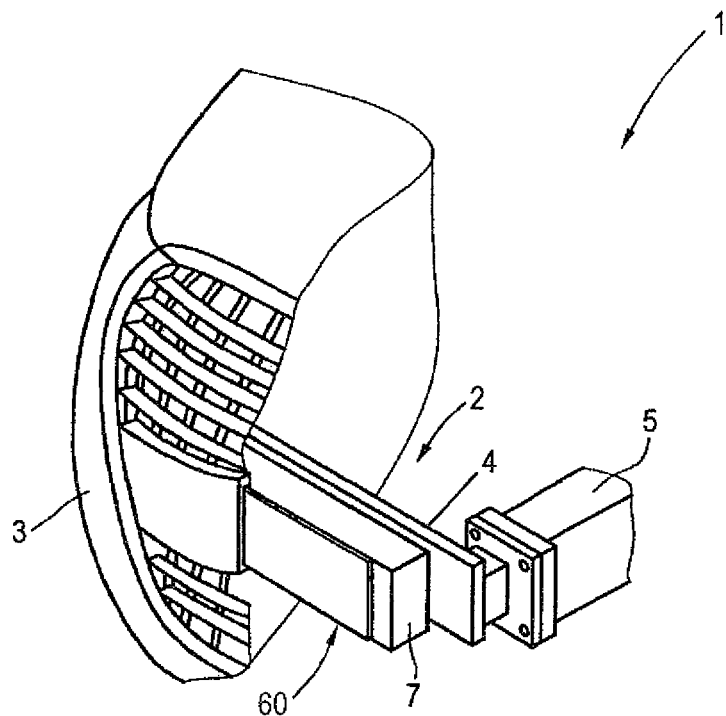
FIG. 1 a schematic representation of a part of a motor vehicle according to the invention in which a sensor integrated in the front side is shown, FIG. 2 a schematic representation of the embodiment of a second condenser electrode of the area-sensor integrated according to the invention, FIG. 3 the second condenser electrode of FIG. 2 with dielectric arranged thereon, FIG. 4 a top view as schematic representation onto the entire capacitive area-sensor, FIG. 5 an equivalent circuit diagram for the area-sensor, FIG. 6 a schematic representation of the analysis unit of the control device, and FIG. 7 two idealized measuring curves.

FIG. 1 shows a partial view of a motor vehicle 1 according to the invention, here the vehicle front with front-side integrated capacitively operating sensor 2. Such a sensor 2 can of course also be provided on the rear of the vehicle.

In the described exemplary embodiment, the sensor 2 is arranged behind a front panel 3 on a metal component in the form of a bumper 4 which itself is fastened on longitudinal members 5, wherein the bumper 4 is part of the sensor 2. The sensor 2 extends over at least half the length and height of the bumper 4, preferably over its entire length and height so as to maximize the sensor surface.

The sensor 2 is configured as capacitive area-sensor, i.e., in the form of a plate condenser. Such a plate condenser is characterized by two plate shaped electrodes between which a dielectric 7 is arranged. In the shown exemplary embodiment, one of these two condenser electrodes involves a first electrode, generally designated by reference numeral 60 and including a sensor foil 6, which will be explained in more detail below. The second electrode is realized by the bumper 4 which is made of steel or aluminum. The dielectric 7 is for example a thermoset or elastomer, optionally foamed. The concrete functionality of the sensor 2 according to the invention will be discussed below, first its construction is explained in more detail.

Figure 2:
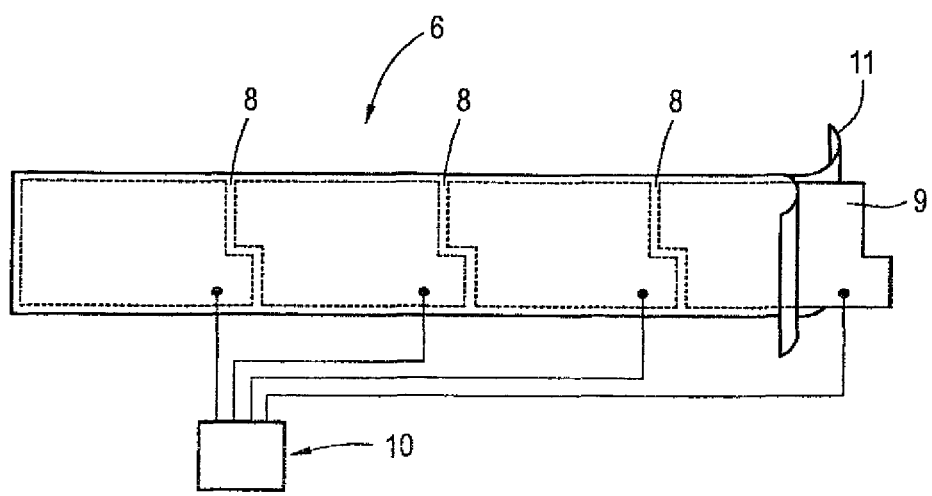
Figure 3:
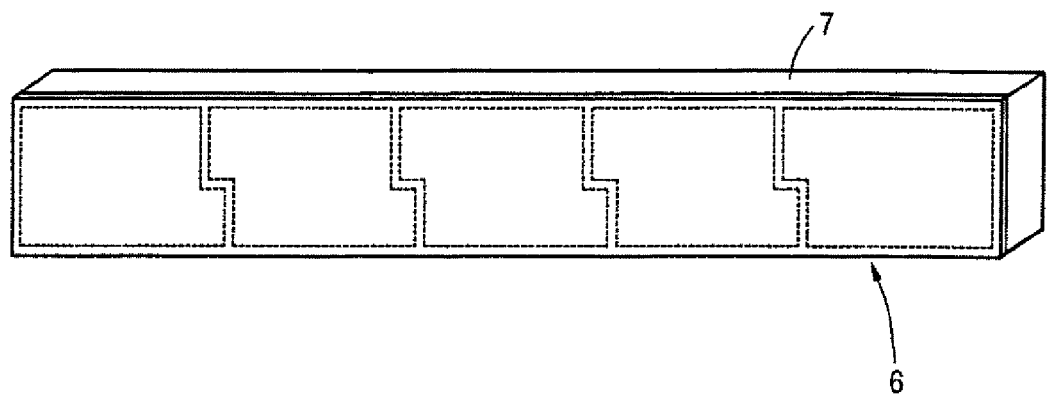

FIGS. 2 and 3 show a schematic representation of the sensor foil 6 which represents the condenser electrode 60. In the shown exemplary embodiment the sensor foil 6 includes five electrode segments 9 which are separated from each other via slots 8, i.e., are isolated, (cf. FIG. 3) which are formed by means of a metal foil, for example aluminum foil or a metal fabric for example from aluminum threads. The electrode segments 9 in their entirety form the condenser electrode 60, however, they serve for forming individual condenser segments which will be discussed below. As shown in the schematic representation of FIG. 2 each electrode segment 9 is separately connected with the control device 10 which performs the signal analysis and with this the collision parameter determination. As a result of the shown use of five condenser electrodes 9, five separate plate condensers thus result in this case, i.e., five sensor segments from which respective separate signals can be derived.

In the shown example the very thin condenser electrode segments 9, for example made of a metal foil with a thickness of 100-500 μm, are received between two carriers 11, i.e., completely encapsulated, wherein the carriers 11 are each made of very thin plastic foil for example a polyester foil onto which the condenser electrode segments 9 are glued and which themselves are glued to each other. As a result a closed sensor foil 6 is formed which can be used as prefabricated component.

The sensor foil 6 is then put onto the elastomer 7 which forms the dielectric, for example also by gluing, so that the sensor foil 6 and the elastomer 7 can be configured as separate component which is then arranged on the bumper 4. The elastomer 7, for example expanded polypropylene, has a thickness of for example 5 cm so that a sufficient distance between the electrode segments 9 or between the front side electrode formed by them and the bumper 4, i.e. the rear side electrode, is formed, which in case of a crash represents the deformation path.

Figure 4:
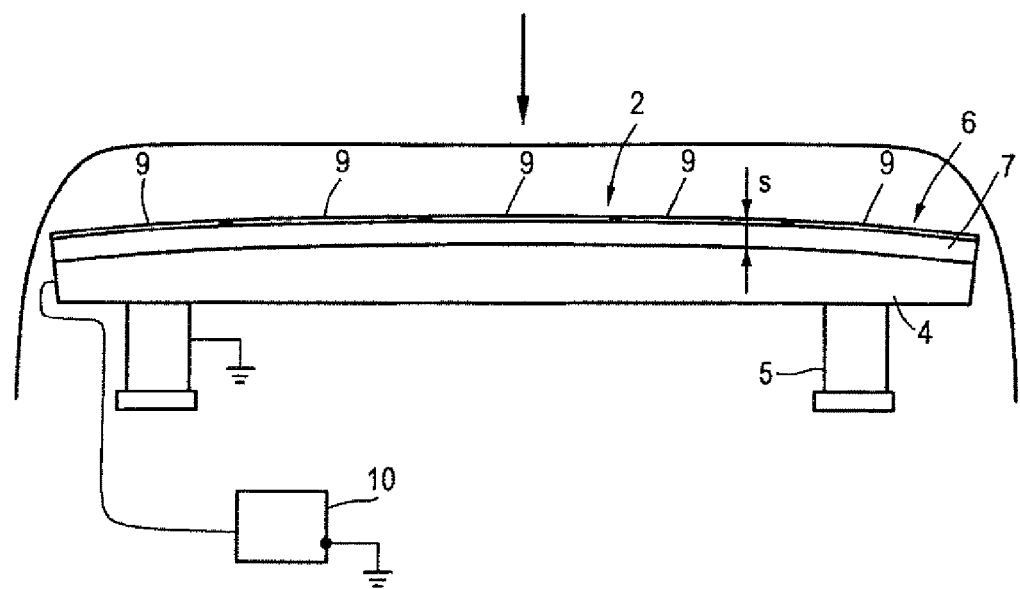

FIG. 4 shows in a schematic representation a top view onto the mounted sensor 2. Shown is again the sensor foil 6 with its five schematically shown separate electrode segments 9, the dielectric 7 and the bumper 4 which forms the other condenser electrode. The bumper 4 is connected to ground via the longitudinal members 5, the same applies to the control device 10, which as can be seen from FIG. 2 is coupled with the respective condenser electrode segments 9, wherein in FIG. 4 a coupling unit is shown.

Figure 5:
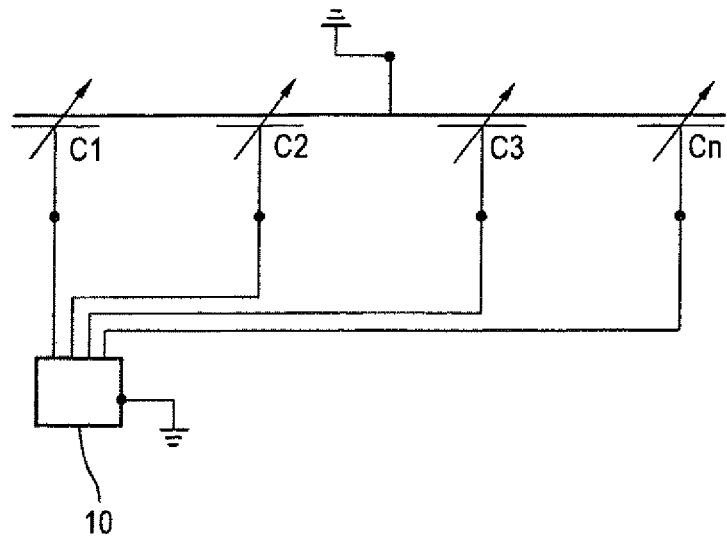

Overall as can be seen in the equivalent circuit diagram of FIG. 5 multiple individual condensers C1-C2 ... Cn result, wherein in the shown exemplary embodiment n=5. Of course more separate electrode segments can be provided than the five shown in the Figures according to FIG. 3 and so as to form more separate individual condenser segments Cn.

It can be seen that each individual condenser or the individual condenser segment C1-Cn is connected with the control device which thus records condenser segment specific measuring values.

As can be seen from FIG. 4 the electrode segments 9 and the bumper 4 or its surface on which the dielectric rests are spaced apart from each other by the distance s. This distance is preferably the same for all condenser segments but can be different so long as the respective concrete distance is known. From this, the capacitance C of the individual condenser segments is given by:

$$C = \varepsilon_0 \cdot \varepsilon_r \cdot \frac{A}{s}$$

with
$\varepsilon_0$=electric field constant
$\varepsilon_r$=dielectric number
A=surface of an electrode segment 9
s=electrode distance.

When, due to a collision (see the impact direction indicated by the arrow in FIG. 4) and a force resulting therefrom the distance s is changed, i.e., a condenser segment 9 is completely or also only locally moved in the direction of the bumper 4, the capacitance of the respectively impacted condenser segment changes in dependence on s. The capacitance generally results according to:

$$C = \frac{1}{U} \int I dt$$

with:
U=condenser voltage
I=condenser current

When comparing the capacitances of the individual condenser segments C1-Cn conclusions can be drawn as to the degree of overlap and the side of collision. Further, the value of the capacitance is a measure of the distance s of the individual plates according to $$s = \varepsilon_0 \cdot \varepsilon_r \cdot \frac{A}{C}$$

From this, the relative collision speed $v_{rel}$ results according to $$v_{rel} = \frac{ds}{dt},$$

with
t=time.
Further, the introduced force F can be determined according to $$F = -\kappa \cdot s - \mu \cdot v_{rel}, \text{ with}$$

F=force
κ=material constant of the dielectric
μ=material constant of the dielectric This means that from the segmenting of the sensor thus a very accurate local determination of the actual collision site can occur because for example in case of a collision in the region of an edge of the vehicle, the condensers or condensers close to the border are of course also only locally deformed as the case may be and as a result a change of the distance is detected first at this location and from this a change of capacitance is detected compared to the other non deformed condenser segments. The collision speed and the introduced force can also be determined and locally assigned in a simple manner.

Figure 6:
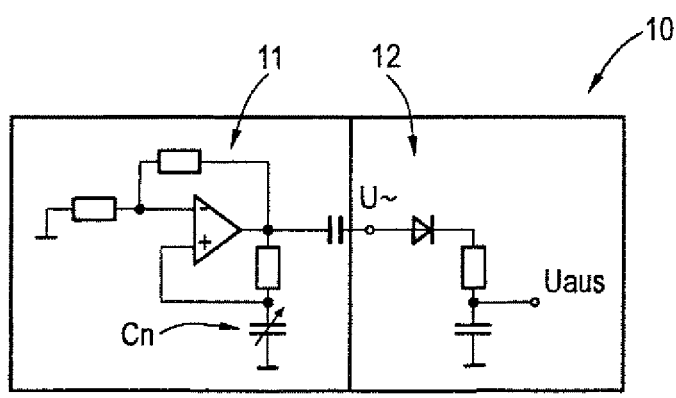

FIG. 6 shows the construction of the analysis unit if the control device 10 in form of a schematic equivalent circuit diagram. The analysis unit includes a capacitance dependent oscillator 11 and a frequency amplitude demodulator 12. Each individual condenser segment C1-Cn is assigned an own oscillator 1 with demodulator 12. The capacitance is measured indirectly via a frequency measurement.

Depending on the distance s of the electrodes of a condenser segment 9, the capacitance of the condenser Cn changes and with this the frequency of the oscillator 11. The AC voltage U~ is converted by the demodulator 12 into a DC voltage $U_{aus}$, wherein the amplitude change ΔU is proportional to the electrode distance s. With the determined values of the plate distance s and the value Δt, the relative speed $v_{rel}$ and the introduced force F can be calculated, see above. The local resolution can be attained by comparison of the individual condenser segments.

Figure 7:
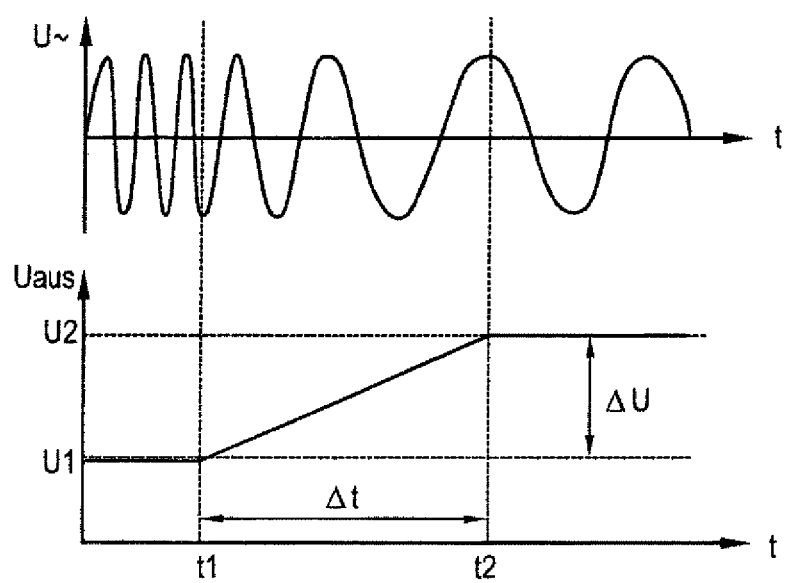

FIG. 7 shows in form of two idealized measuring curves the signal course in the case of a linear impingement of a condenser segment. Up until the time point t1 Cn is constant, the frequency of the AC voltage U~ is constant and also $U_{aus}$ is constant, no deformation is present. At the time point t1 a linear deformation starts which continues up to the time point t2. With this, the electrode distance s changes linearly which is associated with a likewise linear change of Cn and with this the AC voltage U~. The DC voltage $U_{aus}$ changes linearly. The deformation is complete at the time point t2, the plate distance then no longer changes. Due to the small plate distance, a higher voltage, namely U2 is measured which due to the now established constant distance remains constant as the frequency of the AC voltage U~.

Instead of the arrangement of the sensor 2 on a bumper the sensor can also be arranged on other metallic components of the vehicle such as impact members mounted in doors or sills or other transverse or longitudinal members of the vehicle body, the functional principle is always the same.

What is claimed is:

1. A motor vehicle, comprising:
   a metal component of a vehicle structure subject to deformation in the event of a collision;
   at least one area sensor configured as a plate condenser and sized to extend at least half of a width of the metal component, said sensor comprising a first condenser electrode formed by at least a portion of the metal component, a dielectric applied on the metal component, and a second condenser electrode arranged on the dielectric, said second condenser electrode being configured in the form of plural electrode sections which are insulated from one another; and
   a control device operably connected to each of the electrode sections of the second condenser electrode and configured to detect the collision with an object in response to a change in capacity of the electrode sections as a result of the collision and accompanied deformation of individual electrode sections.

2. The motor vehicle of claim 1, wherein the dielectric and the second condenser electrode extend over at least 80% of the width of the metal component.

3. The motor vehicle of claim 1 wherein the dielectric and the second condenser electrode extend over an entire width of the metal component.

4. The motor vehicle of claim 1, wherein the wherein the dielectric and the second condenser electrode extend at least over half a height of the metal component.

5. The motor vehicle of claim 1, wherein the dielectric and the second condenser electrode extend over an entire height of the metal component.

6. The motor vehicle of claim 1, wherein the metal component is a bumper.

7. The motor vehicle of claim 1, wherein the dielectric is made of plastic.

8. The motor vehicle of claim 7, wherein the plastic is foamed plastic.

9. The motor vehicle of claim 8, wherein the foamed plastic is an elastomer.

10. The motor vehicle of claim 8, wherein the foamed plastic is an expanded polypropylene.

11. The motor vehicle of claim 1, wherein the dielectric has a thickness in the range from 1-10 cm.

12. The motor vehicle of claim 1, wherein the dielectric has a thickness from 3-7 cm.

13. The motor vehicle of claim 1, wherein the dielectric has a thickness of 5 cm.

14. The motor vehicle of claim 1, wherein the second condenser electrode is formed by a metal foil, a metal fabric, or a precipitated metal layer.

15. The motor vehicle of claim 14, wherein the metal foil, the metal fabric or the metal layer is made of or contains aluminum.

16. The motor vehicle of claim 14, wherein the metal foil, the metal fabric or the metal layer has a thickness of 10-1000 µm.

17. The motor vehicle of claim 16, wherein the metal foil, the metal fabric or the metal layer has a thickness of 100-500 µm.

18. The motor vehicle of claim 14, wherein the metal foil, the metal fabric or the precipitated metal layer is arranged on a carrier or a plastic carrier, or arranged between two carriers or two plastic carriers.

19. The motor vehicle of claim 18, wherein the carrier is a plastic film.

20. The motor vehicle of claim 19, wherein the plastic film is made of polyester.

21. The motor vehicle of claim 18, wherein the carrier has a thickness in the range from 100-1000 µm.

22. The motor vehicle of claim 1, wherein the adjacent ones of the electrode sections of the second condenser electrode are separated by a slot.

23. The motor vehicle of claim 14, wherein the metal fabric is fiber reinforced.

* * * * *